United States Patent [19]
Berthelier

[11] Patent Number: 6,045,735
[45] Date of Patent: Apr. 4, 2000

[54] METHOD OF MANUFACTURING A TRANSMISSION BELT

[75] Inventor: Marc Berthelier, Athee sur Cher, France

[73] Assignee: Hutchinson Societe Anonyme, Paris, France

[21] Appl. No.: 09/198,777

[22] Filed: Nov. 24, 1998

Related U.S. Application Data

[62] Division of application No. 08/915,043, Aug. 20, 1997, Pat. No. 5,904,630.

[30] Foreign Application Priority Data

Sep. 10, 1996 [FR] France ................... 96 11018

[51] Int. Cl.⁷ ............................ B32B 31/22
[52] U.S. Cl. ................. 264/139; 264/162; 264/320
[58] Field of Search ................. 264/139, 162, 264/258, 320, 324

[56] References Cited

U.S. PATENT DOCUMENTS

| | | |
|---|---|---|
| 3,818,741 | 6/1974 | Terhune . |
| 4,329,192 | 5/1982 | White, Jr. et al. ............. 156/138 |
| 4,931,118 | 6/1990 | Kitahama et al. . |
| 4,956,036 | 9/1990 | Sedlacek .................. 156/137 |
| 5,120,281 | 6/1992 | Mishima et al. . |
| 5,127,886 | 7/1992 | Fujiwara et al. . |
| 5,427,637 | 6/1995 | Mishima et al. . |
| 5,498,212 | 3/1996 | Kumazaki . |

FOREIGN PATENT DOCUMENTS

| | | |
|---|---|---|
| 317 316 | 5/1989 | European Pat. Off. . |
| 429 299 | 5/1991 | European Pat. Off. . |
| 633 408 | 1/1995 | European Pat. Off. . |
| 642 886 | 3/1995 | European Pat. Off. . |
| 694 710 | 1/1996 | European Pat. Off. . |
| 7-280040 | 10/1995 | Japan . |

OTHER PUBLICATIONS

Patent Abstracts of Japan, Publication No. JP 62 113940, vol. 011, No. 333 (M–637), Oct. 30, 1987.

Database WPI, Publication No. JP 07 280040, Section Ch, Week 9601, Derwent Publications Ltd., London, GB.

*Primary Examiner*—Jan H. Silbaugh
*Assistant Examiner*—Dae Young Lee
*Attorney, Agent, or Firm*—Alston & Bird LLP

[57] ABSTRACT

A method of manufacturing a ribbed vulcanized transmission belt having an elastomer cushion layer and an elastomer compression layer in which reinforcing fibers are embedded, wherein the method comprises forming a blank having at least a cushion layer and a compression layer, molding the blank under pressure in a mold provided with an imprint of a plurality of ribs, vulcanizing the blank, and machining off surplus material to uncover protruding ends of the reinforcing fibers in at least one region of each rib. In the vicinity of the surfaces of the ribs, the mean direction of the reinforcing fibers is substantially tangential to the surfaces of the ribs.

7 Claims, 2 Drawing Sheets

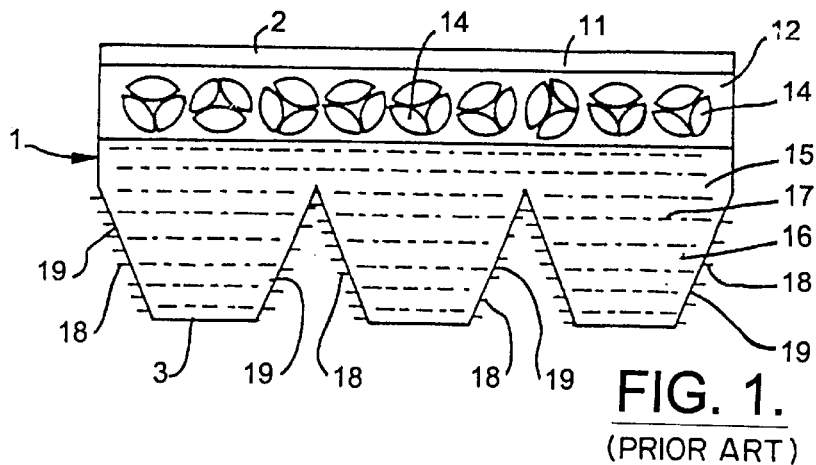
FIG. 1. (PRIOR ART)
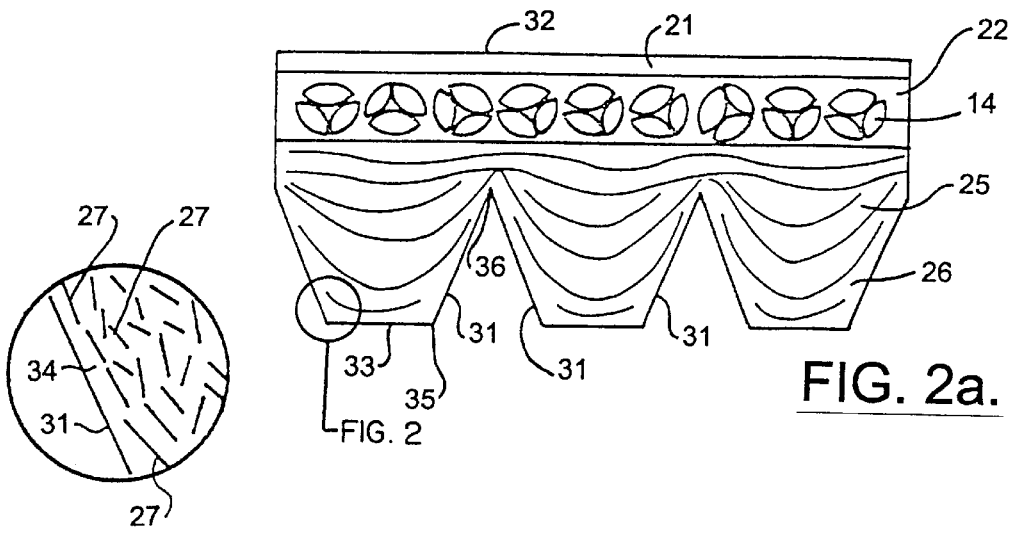
FIG. 2.
FIG. 2a.
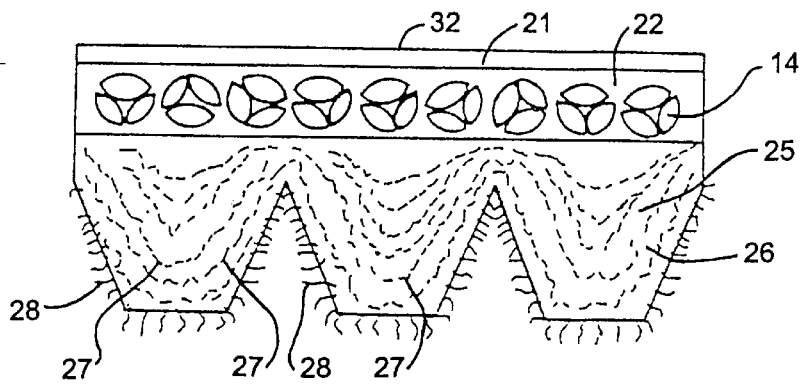
FIG. 2b.

METHOD OF MANUFACTURING A TRANSMISSION BELT

CROSS-REFERENCE TO RELATED APPLICATIONS

This application is a divisional application of application Ser. No. 08/915,043 filed Aug. 20, 1997, now U.S. Pat. No. 5,904,630.

The present invention relates to a method of manufacturing a vulcanized transmission belt referred to as a "ribbed" belt, in particular for an automobile transmission, and to a belt obtained by implementing the method.

BACKGROUND OF THE INVENTION

It is already known, in particular from European Patent Application EP-642 886 (Mitsuboshi), that a ribbed belt can have a backing layer, a cushion layer in which cords are disposed longitudinally, and a "compression" layer in which reinforcing fibers are embedded in a lateral direction of the belt, and on which the ribs of the belt are formed by machining a plane blank, generally by means of a grinding roller, which wastes a considerable amount of material, namely about 30%. Such machining of the ribs uncovers the ends of the reinforcing fibers so that they protrude from the outside of the ribs, and it also nicks the surface of the ribs, thereby forming tear start lines, in particular in the convex regions where the top of each rib meets its sides.

European Patent Application EP-633 408 proposes to apply a thin layer of rubber to the top of each of the ribs so as to coat the protruding fibers and to eliminate the tear start lines. This complicates manufacturing by adding another step.

The solution proposed in Application EP-642 886, which consists in not machining the tops of the ribs and in creating a concave recessed zone between the flat top of each rib and each of its sides, the recessed zone not making contact with the pulley, makes it possible to solve the problem only where it is at its worst, without remedying the problem of the tear start lines that machining can cause, or the problem of wastage of material.

In practice, the life of machined belts is generally shorter than that of other types of belt.

It is however desirable to have belts whose ribs have protruding fibers because such fibers tend to reduce the operating noise of the belt in certain applications.

OBJECTS AND SUMMARY OF THE INVENTION

An object of the invention is to provide a method of manufacturing a ribbed transmission belt whose ribs have protruding fibers and which has a long life.

Another object of the invention is to provide a method of manufacturing a belt, which method minimizes wastage of material.

The invention thus provides a method of manufacturing a ribbed vulcanized transmission belt having an elastomer cushion layer in which longitudinally disposed cords are embedded, and an elastomer compression layer in which reinforcing fibers are embedded and on which longitudinally extending ribs are provided, at least a region of the surface of each of the ribs having protruding fibers protruding from it, said method comprising the following steps:

a) forming a blank having at least said cushion layer and said compression layer;

b) molding said blank under pressure in a mold provided with an imprint of the ribs, said imprint having an outline such that each of the ribs on the belt has surplus material of nominal thickness e in said region;

c) vulcanizing said blank;

d) machining the ribs on the belt to their final dimensions by removing said surplus material so as to uncover protruding ends of the fibers.

The nominal thickness e preferably lies substantially in the range once to twice the thickness of the layer of skin of elastomer at the surface of the ribs and preferably in the range once to 1.5 times said thickness.

For example, the nominal thickness e may lie in the range 0.1 mm to 0.3 mm.

In the method the length of the fibers may lie in the range 0.5 mm to 10 mm, and the proportion by weight of the fibers in the compression layer may lie in the range 2 parts to 30 parts for 100 parts of elastomer.

Said region having protruding fibers may be the side of each of the ribs. In a variant, the entire surface of each of the ribs has protruding fibers.

The invention also provides a ribbed transmission belt having an elastomer cushion layer in which longitudinally disposed cords are embedded, and an elastomer compression layer in which reinforcing fibers are embedded and on which longitudinally extending ribs are provided, said fibers protruding from at least a region of the surface of each of the ribs, wherein, at least in said region and in the vicinity of the surfaces of the ribs, the mean direction of the reinforcing fibers is substantially tangential to the surfaces of the ribs.

In cross-section, the ribs advantageously have lines of movement of the folds of the elastomer that follow the outline of the ribs during a molding operation, and the mean direction of the fibers follows said lines of movement.

BRIEF DESCRIPTION OF THE DRAWINGS

Other characteristics and advantages of the invention appear more clearly on reading the following description given by way of non-limiting example and with reference to the accompanying drawings, in which:

FIG. 1 is a cross-section view through a belt machined using a prior art method;

FIGS. 2a and 2b are cross-section views through a belt molded and machined using the method of the invention, the views being respectively before and after machining; and FIG. 2 is an enlarged, detailed view of a section of FIG. 2a;

MORE DETAILED DESCRIPTION

Figure 3A:
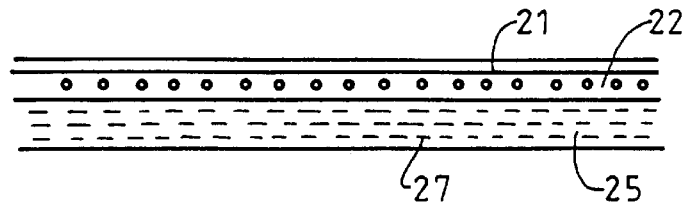
FIGS. 3a to 3c show the method of the invention.

The machined belt shown in FIG. 1 comprises a backing layer 11, in which a woven reinforcement is optionally embedded, a cushion layer 12 of elastomer material in which cords 14 are embedded, the cords being made of, for example, polyester, polyamide, or aramid fibers, and a compression layer 15 in which reinforcing fibers 17 are embedded.

Manufacturing such a belt involves making up a plane blank formed of a stack of layers, and vulcanizing said blank in an autoclave at a pressure approximately in the range 6 bars to 8 bars.

After vulcanization, the ribs 16 are machined by grinding to produce the belt shown in FIG. 1, in which protruding fibers 18 protrude from the sides 19 of the ribs 16. As shown in FIG. 1, the general direction of the fibers 17 is the transverse direction (i.e. parallel to the cross-section plane), and parallel to the faces 2 and 3 of the belt. After machining, the protruding fibers 18 naturally remain in the general direction of the fibers 17.

In addition to involving considerable wastage of material (about 30%), such machining by removing material also weakens to a certain extent the machined surfaces of the ribs 16, i.e. the sides 19 of the ribs in this example, as shown by above-mentioned European Patent Application EP-633 408.

The belt of the invention, shown in FIG. 2a after it has been molded and vulcanized, and in FIG. 2b after it has been machined, comprises a backing layer 21 having external surface 32, in which a woven reinforcement is optionally embedded in the backing layer 21, a cushion layer 22 in which cords 14 are embedded, the cords being made of, for example, polyester, polyamide, or aramid fibers, etc., and a compression layer 25 in which fibers 27 are embedded, the fibers being, for example, natural or synthetic fibers of length in the range 0.5 mm to 10 mm, and present in the compression layer 25 in a proportion by weight in the range 2 parts to 30 parts for 100 parts of elastomer, for example.

Manufacturing a belt of the invention involves making up a plane blank formed of a stack of layers, molding said blank, e.g. in a hydraulic mold at a pressure of 20 bars, and then vulcanizing it so as to obtain the belt shown in FIG. 2a. This belt is provided with ribs 26 whose outline is molded, each of the ribs 26 having a top 33 and sides 31, but this outline not being molded to the final dimensions of the ribs 26. The subsequent machining step gives the final belt shown in FIG. 2b.

As shown in FIG. 2a, the general direction of the fibers 27 is very different from that of the fibers shown in FIG. 1. During molding, the fibers 27 tend to be aligned with the lines of movement of the folds of the rubber, which lines follow the outline of the ribs 26. The closer the lines of movement are to the surfaces of the ribs 26 the more faithfully they follow said outline of the ribs. In the vicinity of the surfaces of the ribs, the general direction of the fibers 27 is almost parallel to the surface of each rib 26 on the sides 31 and on the top 33. In the regions 35 where the top meets the sides 31, and in the grooves 36 between the ribs 26, the general direction changes progressively. Furthermore, it can be observed that, after molding, a layer of skin or limit layer 34 of thickness d exists at the surface (31, 33) of each of the ribs 26, in which layer the fibers 27 are not present (see detail in FIG. 2). This layer has a depth of about 0.1 mm.

The machining step of the invention consists in removing the layer of skin 34, and in setting the machining depth preferably so that it is just enough to uncover the ends 28 of the fibers 27 bordering on the layer of skin 34. Such machining to a depth that is only slightly greater than the depth of the layer 34, prevents nicks from being formed in the surface of the elastomer of the ribs 26, and thereby prevents tear start lines from forming in said surface, which would reduce the life of the belt. Furthermore, although, in the vicinity of the wall 31, the preferred direction of the fibers 27 is substantially parallel to said wall, it can be observed that there is a significant dispersion in the directions of the fibers 27, which dispersion is much greater than that of the fibers 17 in FIG. 1. This dispersion improves the cushion effect procured by the fibers 27, in particular on the sides 31 of the ribs.

COMPARATIVE EXAMPLE

This example corresponds to an accelerated ageing test implemented by equipping a Diesel engine successively with three belts of the same type (6 ribs having a pitch of 3.56 mm), but manufactured using different methods, namely:

belt No. 1: a belt machined using a prior art method;

belt No. 2: a belt molded using a prior art method; and belt No 3: a belt molded and machined using a method of the invention.

The test was continued until the layers 12 and 15 (or 22 and 25) were observed to separate.

For a life equal to 100 for belt No. 1, a life equal to 142 was observed for belt No. 2, and a life equal to 173 was observed for belt No. 3.

The machined belt had the shortest life. It should be noted that the test implemented was a delamination test for which the vulcanization pressure or the molding pressure was very significant.

Comparing the lives of belt No. 3 and of belt No. 2, which belts were molded at the same pressure, shows that the additional machining step of the invention significantly increases the life of the belt, which is particularly surprising in view of the teaching of above-mentioned European Patent Application EP-633 408. In addition, the life of belt No. 3 is much longer than that of belt No. 1, even though the method of manufacturing it is much more economical because the machining step of the invention involves removing a marginal thickness of material resulting in removing a few percent of the material (as compared with the removal of about 30% of the material in a machined belt).

Figure 3B:
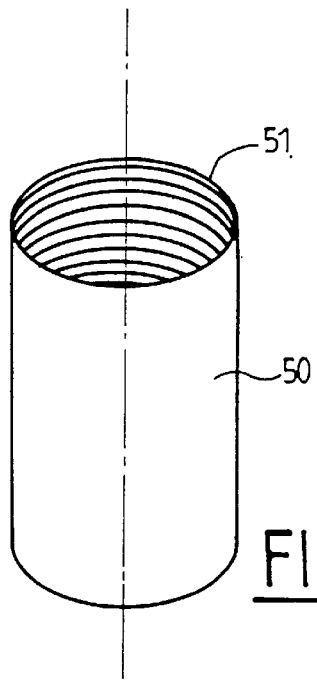
Figure 3C:
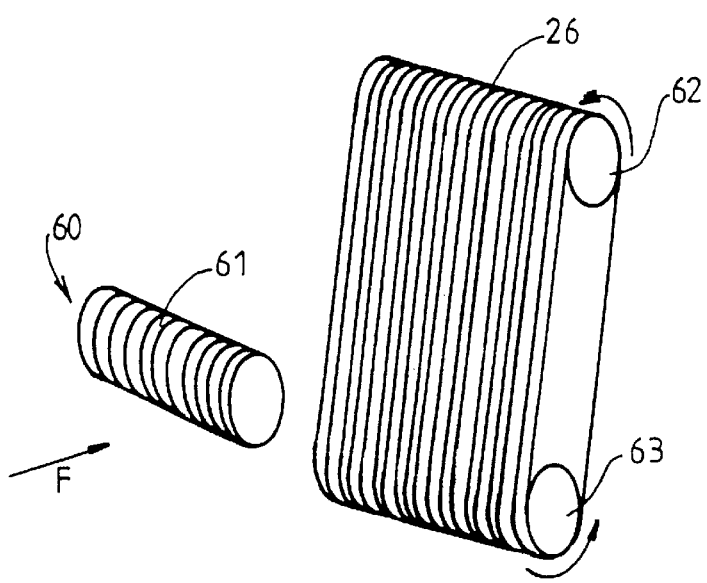

FIGS. 3a to 3c show the method of the invention.

FIG. 3a shows how a blank is made comprising the layers 21, 22, and 25. The general direction of the fibers 27 is transverse (i.e. parallel to the cross-section plane), and parallel to face 2.

FIG. 3b shows how the blank is molded under pressure in a hydraulic mold 50 having an imprint 51 whose outline corresponds to that of the ribs 26 prior to machining (FIG. 2a). The vulcanization step is generally performed in the hydraulic mold 50, at a pressure of about 20 bars.

FIG. 3c shows how the machining step is performed using a grinding roller 60 having the imprint 61 of the ribs 26 in their final dimensions. For this purpose, the vulcanized blank is mounted to rotate on pulleys 62 and 63, and the grinding roller 60 is brought towards the blank to rectify it to the desired depth, as indicated above, to obtain the belt shown in FIG. 2b. After machining, the belt is generally cut up in known manner into a plurality of individual belts.

I claim:

1. A method of manufacturing a ribbed vulcanized transmission belt having an elastomer cushion layer in which longitudinally disposed cords are embedded, and an elastomer compression layer in which reinforcing fibers are embedded and on which longitudinally extending ribs having defined sides are provided, at least a region of the surface of each of the ribs having protruding fibers protruding from each said rib, said method comprising the following steps:

a) forming a blank having at least said cushion layer and said compression layer;

b) molding said blank under pressure in a mold provided with an imprint of the ribs, said imprint having an outline such that each of the ribs on the belt has surplus material in said region forming a skin of elastomer at the surface of the ribs, the surplus material being of nominal thickness e at least equal to the thickness of the skin of elastomer at the surface of each of the ribs;

c) vulcanizing said blank;

d) machining the ribs on the belt to desired final dimensions by removing said surplus material of thickness e so as to uncover protruding ends of said fibers bordering said skin, the thickness e being chosen such that the protruding end of said fibers bordering said skin appear on performing said machining.

2. A method according to claim 1, wherein said nominal thickness e lies substantially in the range once to twice the thickness of the layer of skin of elastomer at the surface of the ribs.

3. A method according to claim 2, wherein said nominal thickness lies substantially in the range 0.1 mm to 0.3 mm.

4. A method according to claim 1, wherein the fibers are of length lying in the range 0.5 mm to 10 mm, and are present in the compression layer in a proportion by weight lying in the range 2 parts to 30 parts for 100 parts of elastomer.

5. A method according to claim 1, wherein the step d) is performed with a rotary grinding roller having an outline corresponding to an inverse configuration of said final dimensions of said ribs to be obtained by machining.

6. A method according to claim 1, wherein said region is the side of each of the ribs.

7. A method according to claim 1, wherein said region is the entire surface of each of the ribs.

* * * * *